United States Patent [19]
Minamizawa

[11] Patent Number: 5,748,337
[45] Date of Patent: May 5, 1998

[54] FACSIMILE DEVICE HAVING A PRINTING FUNCTION

[75] Inventor: Fumihiro Minamizawa, Toyoake, Japan

[73] Assignee: Brother Kogyo Kabushiki Kaisha, Aichi-Ken, Japan

[21] Appl. No.: 624,799

[22] Filed: Mar. 27, 1996

[30] Foreign Application Priority Data

Mar. 27, 1995 [JP] Japan .................................. 7-067630

[51] Int. Cl.⁶ .................. H04N 1/32; H04N 1/00
[52] U.S. Cl. .................. 358/468; 358/434; 358/435; 358/437; 358/442
[58] Field of Search .................. 358/296, 468, 358/437, 434, 435, 442

[56] References Cited

U.S. PATENT DOCUMENTS 5,200,830  4/1993  Imaizumi et al. .............. 358/296
5,448,378  9/1995  Matsumoto .................... 358/468

OTHER PUBLICATIONS

Japanese Patent Application No. HEI 6–285726, filed on Nov. 18, 1994 (to be published in May, 1996).

Primary Examiner—Edward L. Coles, Sr.
Assistant Examiner—Tia M. Harris
Attorney, Agent, or Firm—Kane,Dalsimer,Sullivan, Kurucz, Levy, Eisele and Richard, LLP

[57] ABSTRACT

A facsimile device having a printer function, the facsimile device capable of receiving data from another facsimile device and from a data processing device. The facsimile device includes a device for setting a priority operating mode, the priority operating mode setting one of a print priority mode and a facsimile priority mode, and a device for setting at least one time out period. If the facsimile device is in the print priority mode, the facsimile device is released from the print priority mode after the time out period has elapsed. The facsimile device further includes a device for selecting one of the time out periods in accordance with whether the facsimile device is receiving the computer data from the data processing device.

26 Claims, 10 Drawing Sheets

FACSIMILE DEVICE HAVING A PRINTING FUNCTION

BACKGROUND OF THE INVENTION

The present invention relates to a facsimile device which can receive image data transmitted from either another facsimile device or a computer, and form an image on a recording sheet, in accordance with the received image data.

Conventionally, there is a known a facsimile device which can receive image data from either another facsimile device or a computer, word processor or data processing device, and form an image on a recording sheet. In this type of facsimile device, it is possible that while the facsimile device is printing an image corresponding to image data received from a computer, image data is received from another facsimile device. Conversely, the facsimile device may be receiving image data from another facsimile device, when a user wishes to print computer data from the computer.

One solution to this problem was proposed by the assignee in Japanese Patent Application No. HEI 6-285726. As disclosed in this application, a facsimile device was proposed which has a facsimile priority mode and a print priority mode. When the facsimile priority mode is selected, printing of the image data received from the computer is prohibited. Similarly, when the print priority mode is selected, printing of the image data received from another facsimile device is prohibited.

However, in the above described facsimile device, it is possible that the user leaves the facsimile device in the print priority mode, thereby preventing the reception of image data from another facsimile device.

SUMMARY OF THE INVENTION

It is therefore an object of the present invention to provide an improved facsimile device in which the facsimile device is capable of printing image data received from either another facsimile device or a computer, in the most efficient manner.

According to a first aspect of the present invention, there is provided a facsimile device having a printer function, the facsimile device capable of receiving data from another facsimile device and from a data processing device. The facsimile device includes a device for setting a priority operating mode, the priority operating mode setting one of a print priority mode and a facsimile priority mode, and a device for setting at least one time out period. If the facsimile device is in the print priority mode, the facsimile device is released from the print priority mode after the time out period has elapsed. The facsimile device further includes a device for selecting one of the time out periods in accordance with whether the facsimile device is receiving the computer data from the data processing device.

As such, when the facsimile device sets the printer priority operating mode, a first time out period is selected when the facsimile device is not receiving the computer data from the data processing device. In the preferred embodiment, the first time out period corresponds to a time duration that starts from a setting of the print priority mode.

Further, a second time out period is selected when the facsimile device is receiving the computer data from the data processing device. In the preferred embodiment, the second time out period corresponds to a time duration that starts after the last received computer data has been printed. Furthermore, the first time out period is longer than the second time out period.

Therefore, according to the present invention, when an operator is preparing to send the computer data to the facsimile device to be printed extra time may be required, and thus the time out period is relatively long (for example five minutes). Conversely, after all the computer data has been printed, the time out period is relatively short (for example 10 seconds), after which the facsimile device can receive facsimile data. As a result, the situation in which an operator accidentally leaves the facsimile device in a print priority mode for a long time, can be prevented.

Further, the period during which the facsimile device is prevented from receiving the facsimile data is relatively short. Thus, the operability and efficiency of the facsimile device is improved.

Optionally, the facsimile device further includes a device for converting the received computer data into computer bit map data and a device for forming an image on a recording medium, in accordance with the computer bit map data, when the device for setting a priority operating mode sets the print priority mode.

Alternatively, the facsimile device further includes a device for converting the received facsimile data into facsimile bit map data and a device for forming an image on a recording medium, in accordance with the facsimile bit map data, when the device for setting a priority operating mode sets the facsimile priority mode.

According to a second aspect of the present invention, there is provided a facsimile device having a printer function, the facsimile device including:

a device for receiving facsimile data transmitted from another facsimile device;

a device for receiving computer data transmitted from an external device;

a device for forming an image having a plurality of pixels on a recording medium;

a facsimile output control device for converting the facsimile data into facsimile bit map data, the facsimile output control device controlling the image forming device to form an image corresponding to the facsimile bit map data;

a printer output control device for converting the computer data into computer bit map data, the printer output control device controlling the image forming device to form an image corresponding to the computer bit map data;

a device for setting a priority operating mode, the setting of the priority operating mode determining a priority of printing the facsimile data and the computer data;

a priority mode control device for inhibiting operation of the facsimile output control device if the device for setting the priority operating mode sets a print priority mode, wherein the computer data is given priority; and a time out control device for releasing the print priority mode if the print priority mode is set and the computer data has not been received by the device for receiving the computer data during a predetermined time out period.

Therefore, by releasing the print priority mode after a certain time has elapsed, the situation in which the facsimile device is accidentally left in the print priority mode is prevented, and the operability of the facsimile device is improved.

According to a third aspect of the present invention, there is provided a method for releasing a facsimile device having a printer function, from a print priority mode, the facsimile device receiving computer data from a data processing device. The method including the steps of:

setting a priority operating mode, the priority operating mode setting one of the print priority mode and a facsimile priority mode;

selecting one of a plurality of time out periods in accordance with whether the facsimile device is receiving the computer data from the data processing device;

setting a time out period selected in the selecting step; and releasing the facsimile device from the print priority mode after the time out period has elapsed, if the facsimile device is in the print priority mode.

Therefore, by controlling the facsimile device such that the print priority mode is released after a certain time has elapsed, the situation in which the facsimile device is accidentally left in the print priority mode can be prevented. This will improve the operability of the facsimile device.

According to a fourth aspect of the present invention, there is provided a facsimile device capable of receiving first predetermined data transmitted from a first externally connected device and second predetermined data transmitted from a second externally connected device, the facsimile device being operable at least in a first mode where reception of the first predetermined data is inhibited, and in a second mode where reception of the first predetermined data is allowed. The facsimile device includes a device for setting an operation mode of the facsimile device, and a device for setting a duration of a time out period in accordance with whether the second predetermined data has already been received while the facsimile device is operating in the second mode. The facsimile device controls the setting device to shift the operation mode from the second mode to the first mode in response to the facsimile device operating in the second mode and the second predetermined data not being received after the time out period has elapsed.

Therefore, after a certain time has elapsed, the facsimile device is automatically switched from the second mode to the first mode. Thus, if the first mode is a facsimile priority mode, and the second mode is print priority mode, then the situation in which the facsimile device is accidentally left in the print priority mode can be prevented.

DESCRIPTION OF THE PREFERRED EMBODIMENTS

Figure 1:
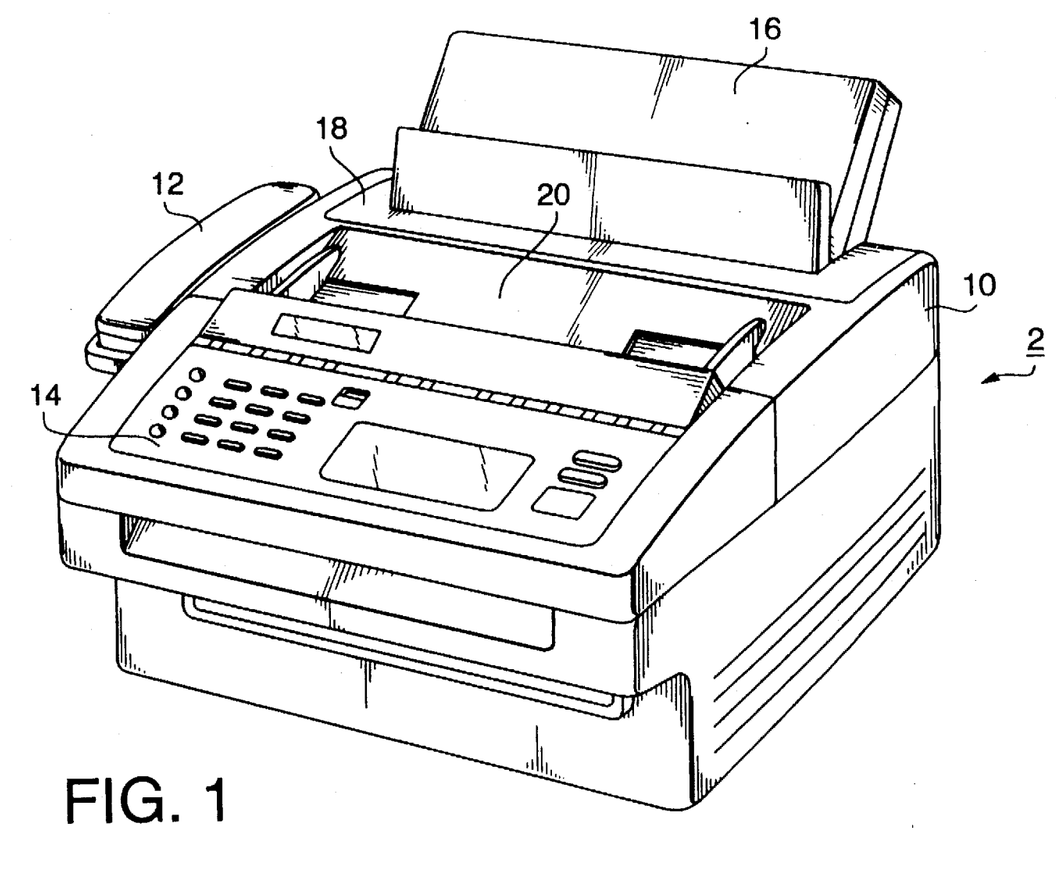
FIG. 1 shows a perspective view of a facsimile device which embodies the present invention.
Figure 2:
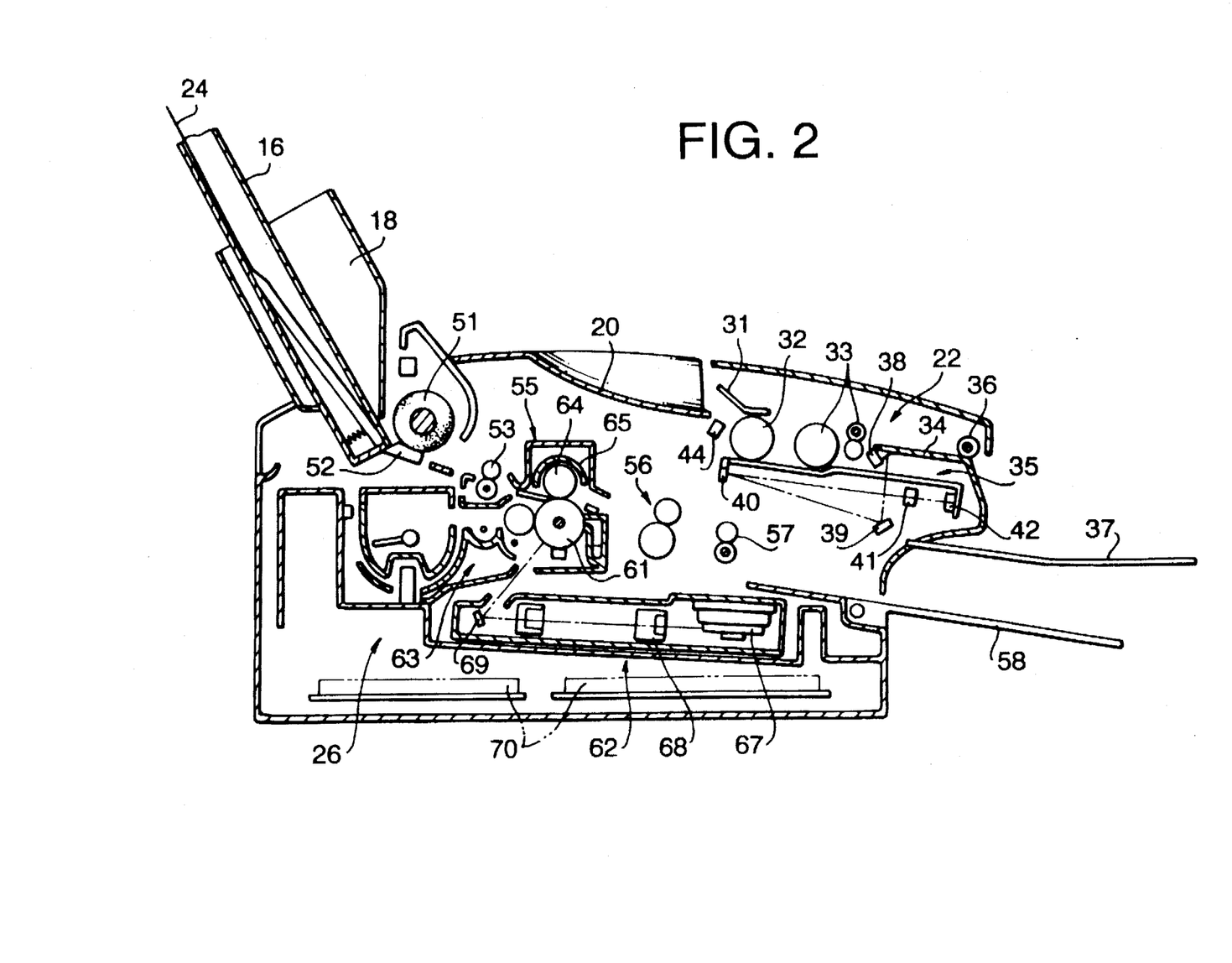
FIG. 2 shows a side view of the facsimile device shown in FIG. 1.

FIG. 1 shows a perspective view of a facsimile device 2 embodying the present invention, and FIG. 2 shows a side view of the facsimile device 2 shown in FIG. 1.

In the preferred embodiment, the facsimile device 2 has two modes of operation. The two modes of operation are a facsimile mode and a printing mode.

In the facsimile mode, an original document is read by the facsimile device 2 and image data (i.e., facsimile data) is output via a telephone line to another facsimile device. Further, the facsimile device 2 can receive facsimile data from another facsimile device and form an image on a recording sheet in accordance with the received facsimile data.

In the printing mode, the facsimile device 2 can receive image data (i.e., computer data) from a computer or a word processor and form an image on a recording sheet in accordance with the received computer data.

As shown in FIG. 1, the facsimile device 2 has a body 10 on which a handset 12 is mounted to a side wall thereof. A top cover of the facsimile device 2 has an operation panel 14, a paper cassette receptor 18, a paper cassette 16, and an original document tray 20. As shown in FIGS. 1 and 2, the paper cassette receptor 18 receives the paper cassette 16 which stores the blank recording sheet onto which an image is formed.

Further, as shown in FIG. 2, the body 10 of the facsimile device 2 includes a scanner unit 22 for reading an image of an original document placed on the original document tray 20, an image forming unit 26 for forming an image on a recording sheet 24 supplied by the sheet cassette 16, and a control unit 70 for controlling the operation of the scanner unit 22 and the image forming unit 26.

Original documents placed on the original document tray 20 are individually fed onto an original support plate 34 of the scanner unit 22 by a feeding mechanism which includes a sheet separating pad 31, a sheet separating roller 32, and feed rollers 33. The image on the original document is read by an image reading unit 35 located below the original support plate 34. After the image on the original document has been read, the original document is discharged from the scanner unit 22 by a discharge roller 36 and is stacked on a discharge sheet tray 37.

The image reading unit 35 has a light source 38, mirrors 39 and 40, a lens 41, and a line image sensor 42. The surface of the original document is illuminated with light emitted by the light source 38. Light reflected by the surface of the original document is then reflected by the mirrors 39 and 40, and focused, by the lens 41, on the light receiving surface of the light line image sensor 42. Since the configuration of the image reading unit 35 is well known, and any kind of similar image reading device is applicable, no further description will be provided. An original document sensor 44 for detecting whether an original document is placed on the original document tray 20 is provided at a predetermined position along a sheet traveling path located between the original document tray 20 and the sheet feeding mechanism.

Recording sheets accommodated in the recording sheet cassette 16 are fed individually using a feed roller 51 and a sheet separation pad 52 into the image forming unit 26. The recording sheet 24 introduced into the image forming unit 26 is fed to the image forming device 55 by a feeding roller 53. A toner image is formed on the recording sheet by the image forming device 55.

The recording sheet 24 bearing the unfixed toner image is fed to the fixing device 56, where the toner image is fixed onto the recording sheet 24. After the toner image is fixed, the recording sheet 24 is discharged using a discharge roller 57, and stacked on a discharged sheet tray 58 provided at the front of the body 10.

The fixing device 56 has a heat roller having a built-in heater, and a pressure roller. The heat roller and the pressure roller apply heat and pressure to the recording sheet 24 which is nipped therebetween so that the toner image is fixed. In the preferred embodiment, the fixing device 56 is a well known fixing device, and therefore no further description will be given.

The image forming device 55 has a photoconductive drum 61, and a laser scanning device 62 for emitting a scanning laser beam to form a latent image on the surface of the photoconductive drum 61. A developing device 63 applies toner to the latent image for developing the image, and a transfer device 65 having a transfer roller 64 transfers the developed image (toner image) onto the recording sheet 24 by charging the recording sheet 24. Further, the laser scanning device 62 includes a laser emitting unit 67 which emits a laser beam under the control of the control unit 70, a lens 68 for converging the laser beam, and a mirror 69 for directing the converged laser beam towards the photoconductive drum 69.

Figure 3:
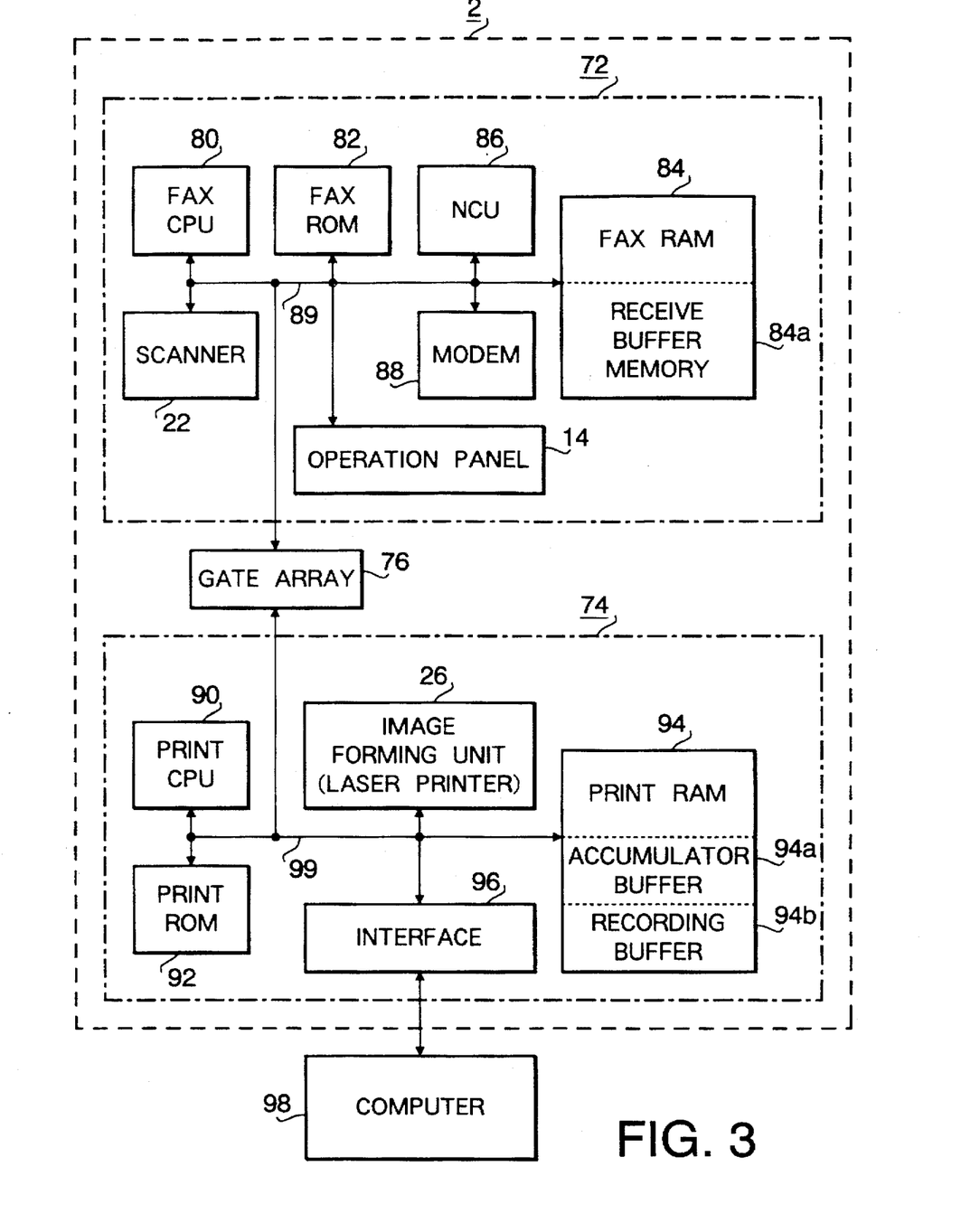
FIG. 3 shows a block diagram of a control unit of the facsimile device shown in FIG. 1.

FIG. 3 is a block diagram of the control unit 70 of the facsimile device 2. The control unit 70 has a facsimile unit 72, a printer unit 74 and a gate array 76 connecting the facsimile unit 72 and the printer unit 74.

The facsimile unit 72 receives various commands input by the user through the operation panel 14. The mode of operation, the reading of the original documents, the transmission/reception of the facsimile data, the developing of the received facsimile data into dot pattern data, and the transmission of the dot pattern data to the printer unit 74 are executed in accordance with the commands received from the operation panel 14.

The facsimile unit 72 has a fax CPU (Central Processing Unit) 80, a fax ROM (Read Only Memory) 82, a fax RAM (Random Access Memory) 84, an NCU (Network Control Unit) 86 which enables transmission of the facsimile data between the facsimile device 2 and a telephone or another facsimile device, and a MODEM 88 for transmitting/ receiving facsimile data through the NCU 86. The fax RAM 84 has a receive buffer memory 84a for receiving incoming facsimile data.

The fax CPU 80, the fax ROM 82, the fax RAM 84, the NCU 86, the MODEM 88, and the operation panel 14 are connected to each other through a fax bus 89. The gate array 76 is also connected to the fax bus 89. The NCU 86 is connected with the handset 12 and a speaker which outputs a ringing tone. An ordinary telephone call (i.e., voice) can also be made using the handset 12.

The printer unit 74 controls the image forming unit 26 to form an image on the recording sheet in accordance with the facsimile data transmitted from the facsimile unit 72 through the gate array 76.

The printer unit 74 has a well-known microcomputer provided with a print CPU 90, a print ROM 92, and a print RAM 94, etc. The print RAM 94 includes an accumulator buffer 94a and a recording buffer 94b.

Further, the printer unit 74 has an interface 96 for receiving computer data from a computer or another data processing device. When the computer data is transmitted to the interface 96, the print CPU 90 controls the image forming unit 26 to form an image in accordance with the received computer data. The print CPU 90, the print ROM 92, the print RAM 94, the interface 96, the image forming unit 26, and the gate array 76, are connected to each other through a print bus 99.

A priority setting routine, a facsimile data receiving routine, and a printing routine for forming an image on a recording sheet in accordance with the received facsimile data and the received computer data, are some of the control operations performed by the facsimile unit 72 and the printer unit 74. These routines will be described with reference to the flowcharts shown in FIGS. 4 through 10.

Figure 4:
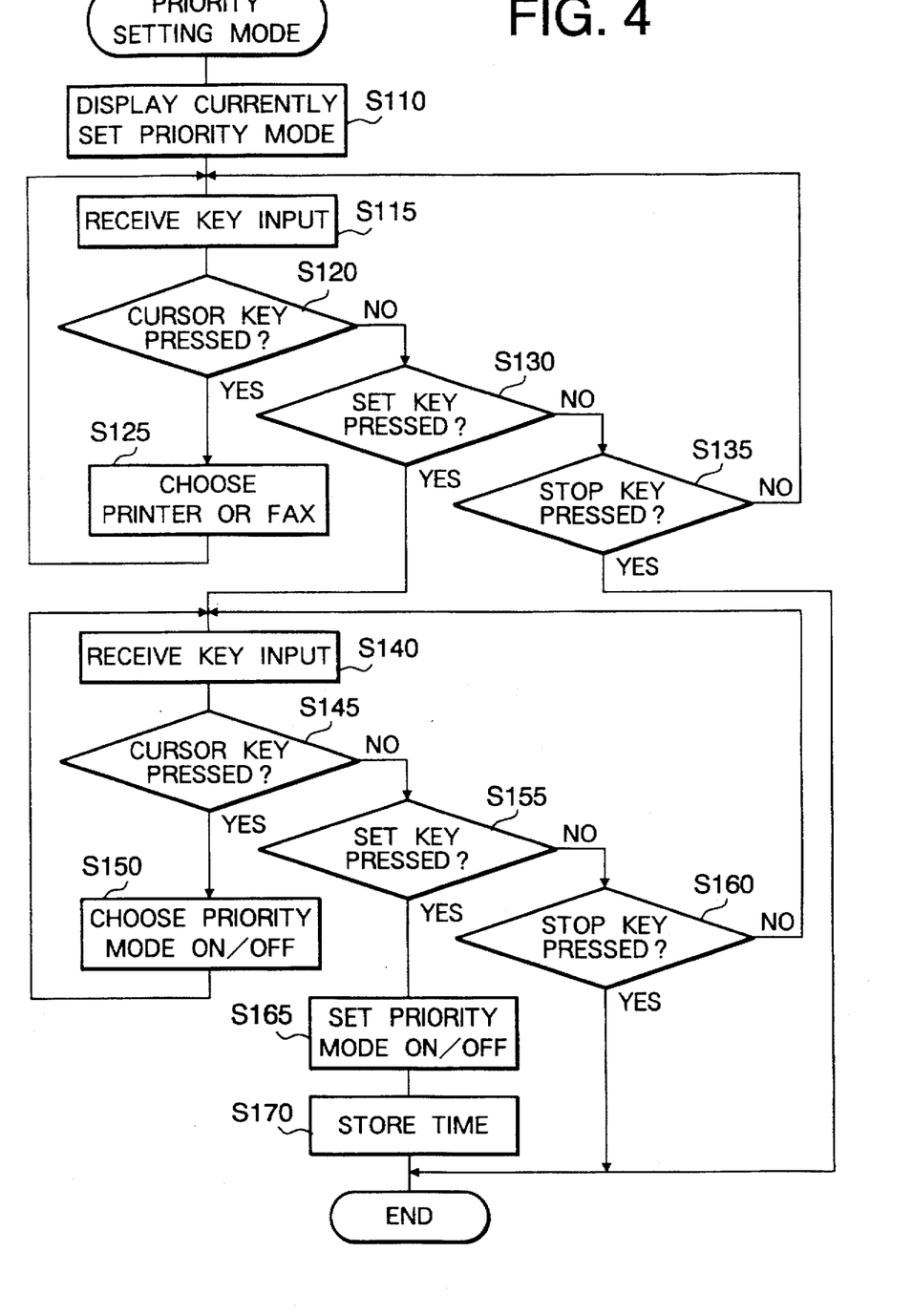
FIG. 4 shows a flowchart of a priority setting mode executed by the facsimile device shown in FIG. 1.

FIG. 4 is a flowchart showing the priority setting mode routine.

In the priority setting routine, the facsimile priority mode or the print priority mode can be selected. The priority mode is selected by operating a predetermined function key provided on the operation panel 14. The priority setting routine is executed by the fax CPU 80 when the fax CPU 80 receives a mode setting command.

Initially, in step S110, a mode setting screen image is displayed on a display provided on the operation panel 14. The mode setting screen image displays the currently selected priority mode (i.e., the print priority mode or the facsimile priority mode) and whether the priority mode is ON or OFF. Then in step S115, the key input by the user is received.

When the mode setting screen is displayed, the user can select either the print priority mode or the facsimile priority mode by operating the cursor keys provided on the operation panel 14. Thus, step S120 determines whether a cursor key has been pressed. If a cursor key has been pressed (S120:YES), then step S125 determines whether the print priority mode or the facsimile priority mode has been selected, and control returns to step S115, where the key input is received.

If the cursor key is not pressed, but a set key is pressed (S120:NO, S130:YES), then the selected priority mode is set. However, if a stop key was pressed (S120:NO, S130:NO, S135:YES), then the routine ends, and the setting of the priority mode is not changed. If any other key is pressed (S120:NO, S130:NO, S135:YES), then control returns to step S115, where the key input is received.

After the set key is pressed, control proceeds to step S140 where the key input is received. At step S140, the user can turn the priority mode ON or OFF, by pressing one of the cursor keys on the operation panel 14. Thus, if step S145 determines that one of the cursor keys is pressed (S145:YES), then the priority mode is turned ON or OFF (i.e., changed to the opposite condition that it is currently in), in step S150.

If the cursor key was not pressed (S145:NO), then step S155 determines whether the set key is pressed. If the set key is pressed (S155:YES), then the priority mode selected in step S125 and set in step S130 is turned ON or OFF in step S165, in accordance with the setting in step S150. Further, the priority mode setting is stored in the fax RAM 84. The facsimile or print priority mode set in step S165 that is stored in the fax RAM 84 will override the currently set priority mode, thereby canceling the current setting.

Then in step S170, the current time is read from a timer (not shown) and stored in the fax RAM 84 as the priority mode set time. Further, the priority mode setting and the stored time are also transmitted to print CPU 90 and stored in the print RAM 94. This allows the data to be used when printing the received facsimile data or received computer data.

Figure 5:
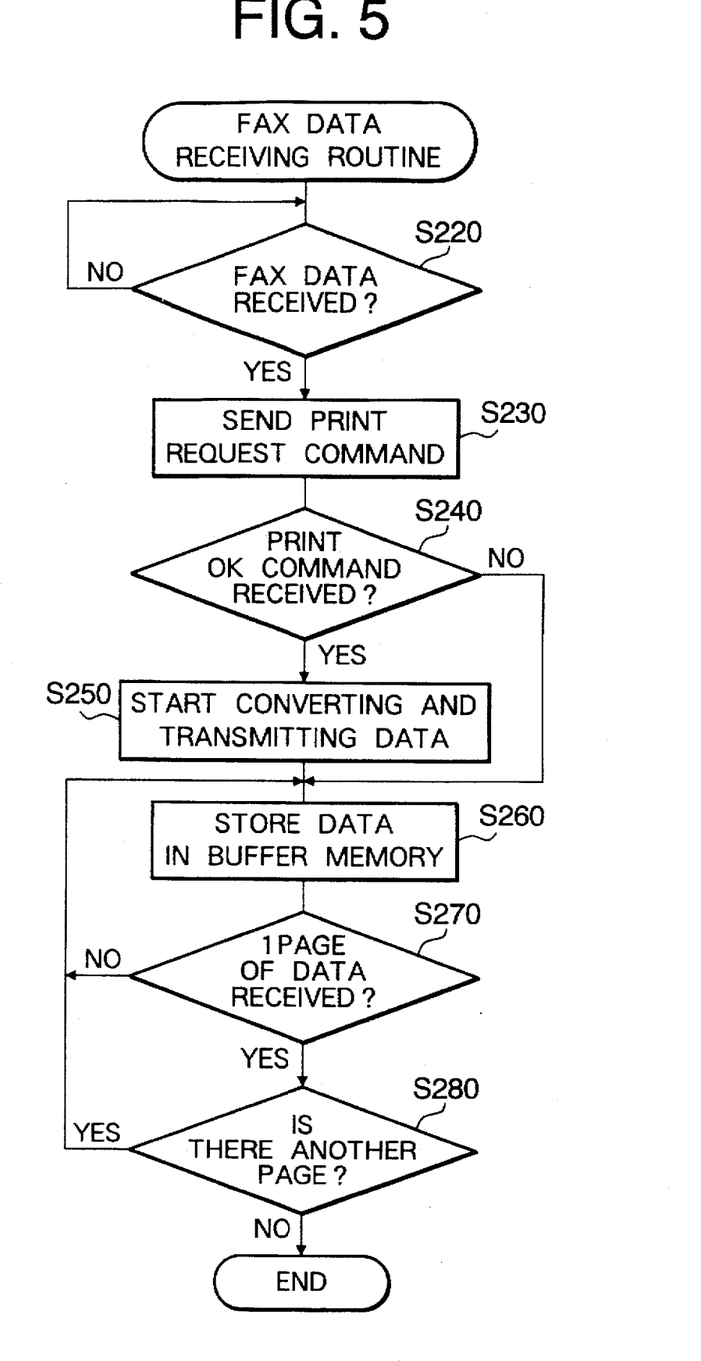
FIG. 5 shows a flowchart of a facsimile data receiving routine repeatedly executed by the facsimile device shown in FIG. 1.

FIG. 5 shows a main routine of a facsimile data receiving routine repeatedly executed by the fax CPU 80.

As shown in FIG. 5, step S220 is repeated until the NCU 86 and the MODEM 88 receive facsimile data. If the facsimile data is received (S220:YES), the fax CPU 80 sends a print request command in step S230 to the printer unit 74. Step S240 determines whether a print OK command transmitted from the print CPU 90 has been received by the fax CPU 80. The print CPU 90 transmits the print OK command when the printer unit 74 is ready to computer data.

If the fax CPU 80 received the print OK command (S240:YES), then in step S250, facsimile data stored in the receive buffer memory 84a of the fax RAM 84 is transmitted to the printer unit 74. Further, step S250 starts the conversion of the data to a dot pattern image (see FIG. 6), suitable for forming an image. The data conversion and transmission routine is performed during an idle period of the facsimile data receiving routine. If the print OK command is not received (S240:NO) or a print NG (no good) command is received, then step S250 is skipped.

After starting the data conversion and transmission routine, control proceeds to step S260, where the facsimile data received by the NCU 86 and the MODEM 88 is stored in the receive buffer memory 84a. Step S270 determines whether a page of data has been received. If a page of data has not been received (S270:NO), then step S260 is repeated. Otherwise (S270:YES), step S280 determines whether there is another page of data to be printed. If there is another page of data received by the NCU 86 and the MODEM 88 that is to be printed (S280:YES), then control returns to step S260, where the data is stored in the receive buffer memory 84a.

If there are no more pages to print (S280:NO), then the facsimile data receiving routine is ended.

If the print OK command was not received in step S240, the storage of data is performed in steps S260 through S280. However, the fax CPU 80 periodically transmits the print request command to the print CPU 90. Then, when the print OK command is received (i.e., the printer unit 74 is ready to print), the data conversion and transmission routine is executed, and the facsimile data stored in the receive buffer memory 84a is transmitted to the printer unit 74.

Figure 6:
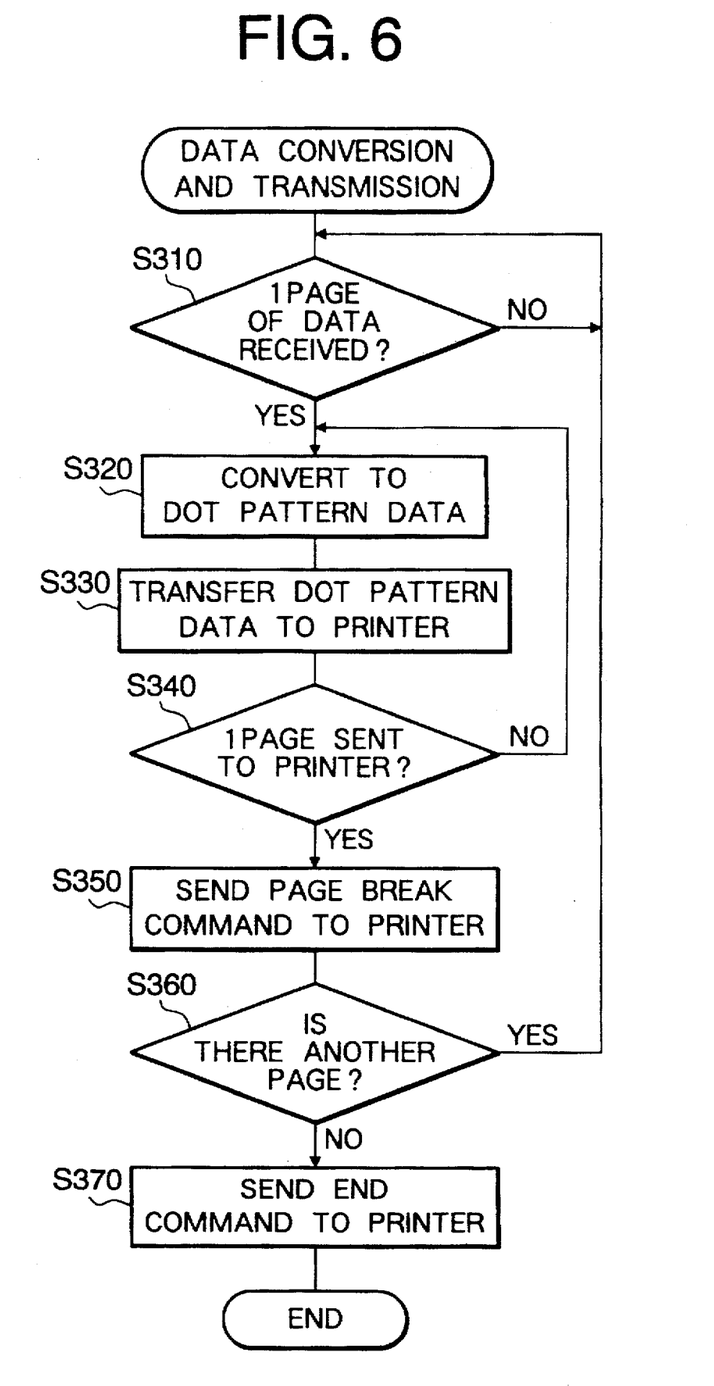
FIG. 6 shows a flowchart of a data conversion and transmission routine of the facsimile device shown in FIG. 1.

FIG. 6 is a flowchart illustrating the data conversion and transmission routine that is started in step S250 of the flowchart shown in FIG. 5.

Step S310 is repeated until one page of data is stored in the receive buffer memory 84a. Then when one page of data is stored in the receive buffer memory 84a (S310:YES), step S320 converts the data to a dot pattern (bit map data). The dot pattern data is then transferred to the printer unit 74, in step S330. Step S340 determines whether one page of data has been transmitted to the printer unit 74. If one page of data has not been sent to the printer unit 74 (S350:NO), then control returns to step S320. Otherwise (S340:YES), a page break command is sent in step S350.

Step S360 determines whether there is another page to be printed. If there is data for another page stored in the receive buffer memory 84a (S360:YES), then control returns to step S310. Otherwise, if all the data stored in the receive buffer memory 84a has been printer (S360:NO), then an end command is sent to the printer unit in step S370, and the data conversion and transmission routine ends.

Thus, as described above, the facsimile data stored in the receive buffer memory 84a is converted to the dot pattern data (bit map data) and transmitted to the printer unit 74.

Figure 7:
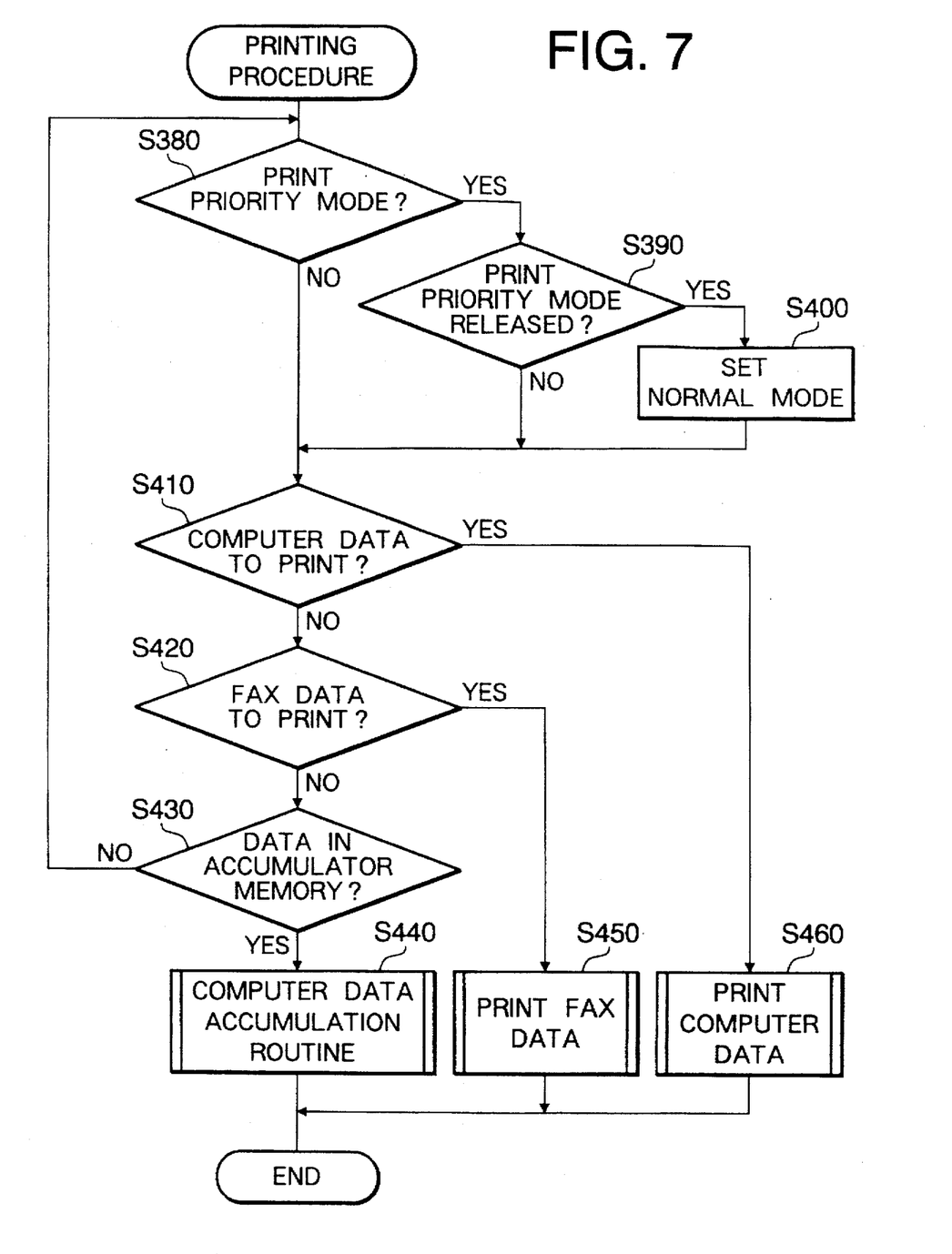
FIG. 7 shows a flowchart of a main printing routine of the facsimile device shown in FIG. 1.

FIG. 7 shows a main printing routine executed by the print CPU 90.

Step S380 determines whether the print priority mode is currently set. If the print priority mode is set (S380:YES), then step S390 determines whether the print priority mode is to be released. This determination is made in accordance with whether the computer data is being transmitted to the printer unit 74, as explained below.

If the computer data is not being transmitted to the printer unit 74, the priority mode set time which was stored in the priority mode setting routine (in the routine shown in FIG. 4) is read out of the print RAM 94. Then the time read out of the print RAM 94 is compared with the current time which is obtained from the timer unit (not shown). If a first time out period (equal to five minutes) has elapsed, then step S390 determines that the print priority mode is released.

However, if the computer data is being received, a computer data recorded time (which is stored during a computer data or accumulated data printing routine) is read out of the print RAM 94, and is compared with the current time which is measured by the timer unit. If a second time out period (equal to ten seconds) has elapsed, then step S390 determines that the print priority mode should be released.

A setting of a computer data receiving flag determines whether the computer data is being transmitted. The computer data receiving flag is set (equal to 1) in a computer data printing routine shown in FIG. 8, and reset (i.e., set equal to 0) when the ON/OFF status of the priority mode is changed (i.e., in the priority mode setting routine, data indicating the settings and time of the priority mode is transmitted from the facsimile unit 72).

If the step S390 determines that the print priority mode should be released (S390:YES), the priority mode is changed to a normal mode and the changed mode is stored in the print RAM 94 in step S400.

Therefore, as described above, if the print priority mode is selected, and no data is received, the currently selected mode (the print priority mode) is not released for at least five minutes. However, if the print priority mode is selected, and the computer data is transmitted, the print priority mode is not released for at least ten seconds after the computer data has been printed (i.e., an image has been formed on the recording sheet).

The first time out period is set to five minutes to allow a user to set up the computer 98 in order to transmit computer data to the facsimile device 2. The computer 98 may also spool the file before printing, thereby requiring more time than usual for preparing the computer data.

The second time out period is set to 10 seconds in order to prevent the printing of the data from being interrupted, and is thus relatively short.

Step S410 determines whether there is any computer data to be printed. If there is computer data to be printed (S410:YES), then the data is printed in the computer data printing routine in step S460. Otherwise (S410:NO), step S420 determines whether there is any facsimile data to be printed.

If there is facsimile data to be printed (S420:YES), then a facsimile data printing routine (shown in FIG. 9) is executed in step S450. Otherwise (S420:NO), step S430 determines whether is there is data to be printed in a accumulator buffer 94a of the print RAM 94. The accumulator buffer 94a stores computer data transmitted from the computer 98. If the accumulator buffer 94a stores data to be printed (S430:YES), then the data stored in the accumulator buffer 94a is printed in an accumulated data printing routine in step S440 (and shown in FIG. 10). If the accumulator buffer 94a does not store any computer data, control returns to step S380.

Figure 8:
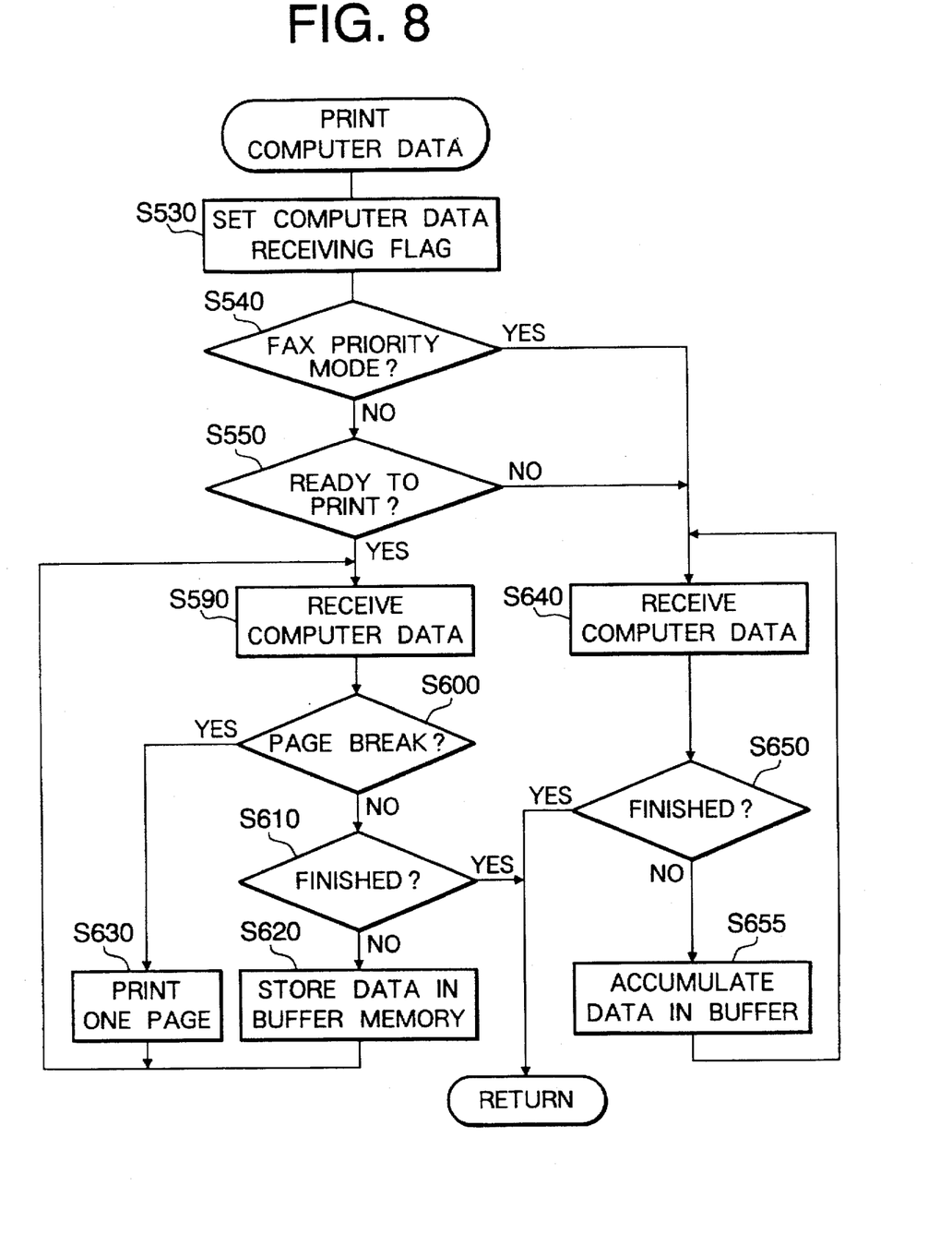
FIG. 8 shows a flowchart of a computer data printing routine of the facsimile device shown in FIG. 1.

FIG. 8 shows a flowchart illustrating the computer data printing routine.

In the computer data printing routine, a computer data receive flag is set equal to 1 in step S530. The computer data receive flag is referenced in the priority mode setting routine shown in FIG. 4. Step S540 determines whether the facsimile priority mode is selected. If the facsimile priority mode is not set (i.e., the currently selected mode is the normal mode or the print priority mode), then step S550 determines whether the printer unit 74, and more specifically, the image forming unit 26 is ready to print the computer data.

If the image forming unit 26 is ready to print the computer data (S550:YES), then the print CPU 90 receives the computer data through the interface 96 in step S590. Step S600 determines whether the received data is a page break command. If the page break command is received (S600:YES), then one page is printed in step S630, and control returns to step S590, where the computer data is received.

If the page break command is not received (S600:NO), then the step S610 determines whether an end-of-data command has been received (i.e., whether there is any more data to be printed). If there is no more data to be printed (S610:YES), then control returns to the main routine shown in FIG. 7. Otherwise (S610:NO), the data is stored in the recording buffer 94b.

Thus, while the page break command or the end-of-data command are not received, the data is stored in the recording buffer 94b. Then when the page break command is received, the recording buffer 94b will store the contents of one sheet of data to be printed, in step S630.

In this case, the computer data stored in the recording buffer 94b is transferred to the laser scanning device 62. The laser scanning device 62 is controlled to emit a laser beam in accordance with the computer data. While the laser beam is being emitted, the feed rollers 51, 53, the fixing device 56, the discharge roller 57, the photoconductive drum 61, the developing device 63 etc., are driven synchronously.

If the computer data is the end of data command at S610, the current time is read out of the time measuring timer, and the current time is stored in the RAM 94 as a computer data recorded time in step S635. As no more data is transmitted from the computer, the computer data printing routine is finished.

If the facsimile priority mode is selected in step S540, or the image forming unit 26 is not ready to print the computer data in step S550, then the computer data is received in step S640. While the end-of-data command is not detected in step S650, the received computer data is accumulated in a data accumulating buffer 94a in step S655. In other words, if the facsimile priority mode is selected or the image forming unit 26 is not ready to print, only the reception of the computer data is allowed. When the end-of-data command is detected, the current time is stored in the RAM 94 in step S635 and the routine is finished.

Figure 9:
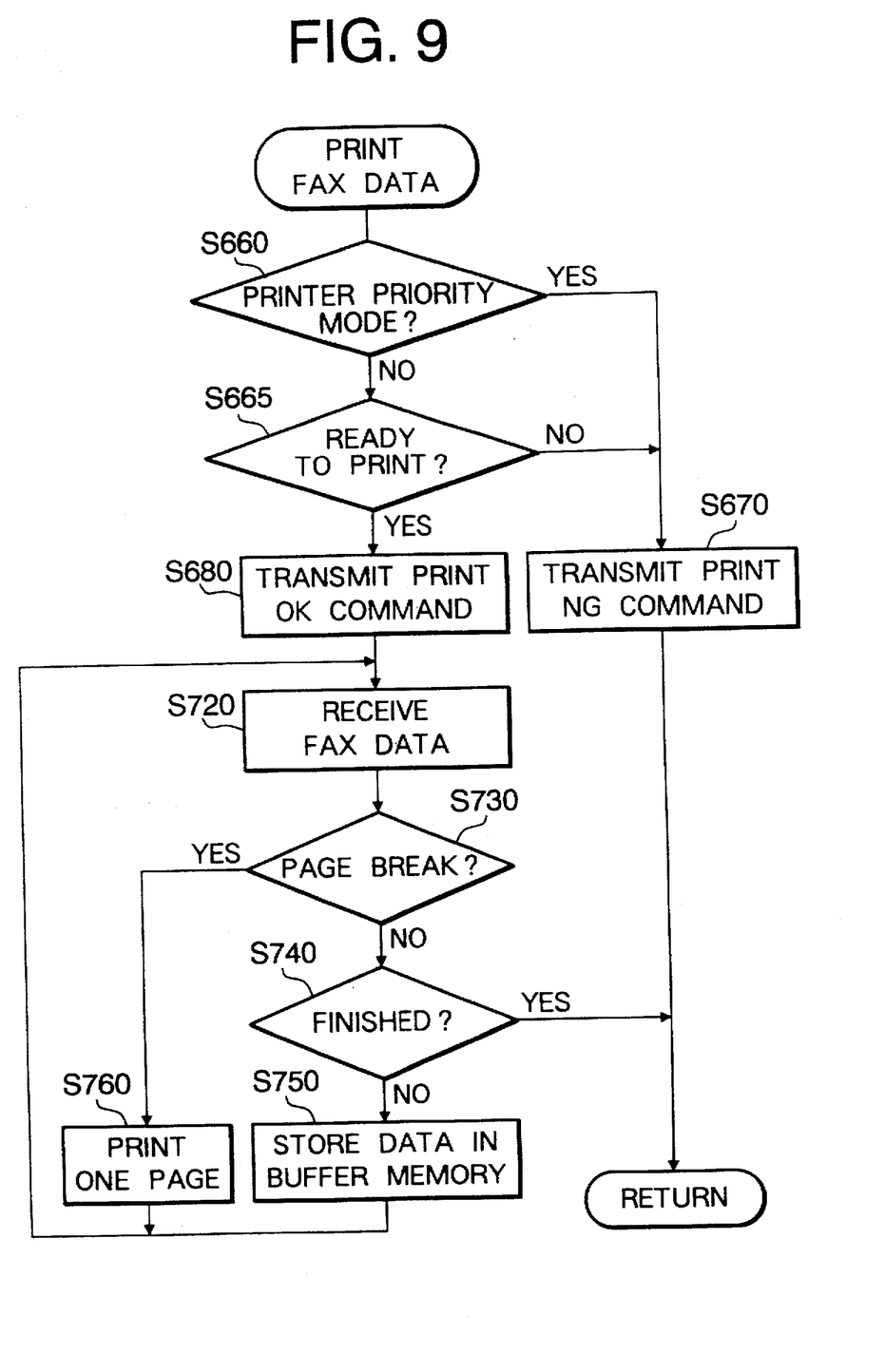
FIG. 9 shows a flowchart of a computer data printing routine of the facsimile device shown in FIG. 1.

FIG. 9 shows a facsimile data printing routine called from the main printing routine shown in FIG. 7.

Initially step S660 determines whether the print priority mode is selected. If the print priority mode is not set in step S660 (i.e., the currently selected mode is the normal mode or the facsimile priority mode), then step S665 determines whether the image forming unit 26 is ready to print data.

If the currently selected mode is the print priority mode, (S660:YES), or the image forming unit 26 is not ready to print (S665:NO)), then a print NG (no good) command indicating that the facsimile data cannot be printed, is sent to the facsimile unit 72 in step S670, and the facsimile data printing routine is terminated.

Otherwise (S665:YES), the print OK command is transmitted to the facsimile unit 72 in step S680.

At step S720, the print CPU 90 receives the facsimile data through the gate array 76. Steps S730 and S740 determine whether the page break command and the end-of-data command have been received, respectively. While neither the page break command nor the end-of-data command is received (S730:NO, S740:NO), the received facsimile data is stored in the memory buffer 94b of the print RAM 94. Control then returns to step S720.

However, when the page break command is received (S730:YES), the memory buffer 94b stores data corresponding to one page of facsimile data. Therefore, at step S760, the print CPU 90 controls the image forming unit 26 to form an image on the recording sheet 24. Control then returns to step S720.

If the end-of data command is received (S740:YES), then the routine ends and control returns to the main printing routine shown in FIG. 7.

Figure 10:
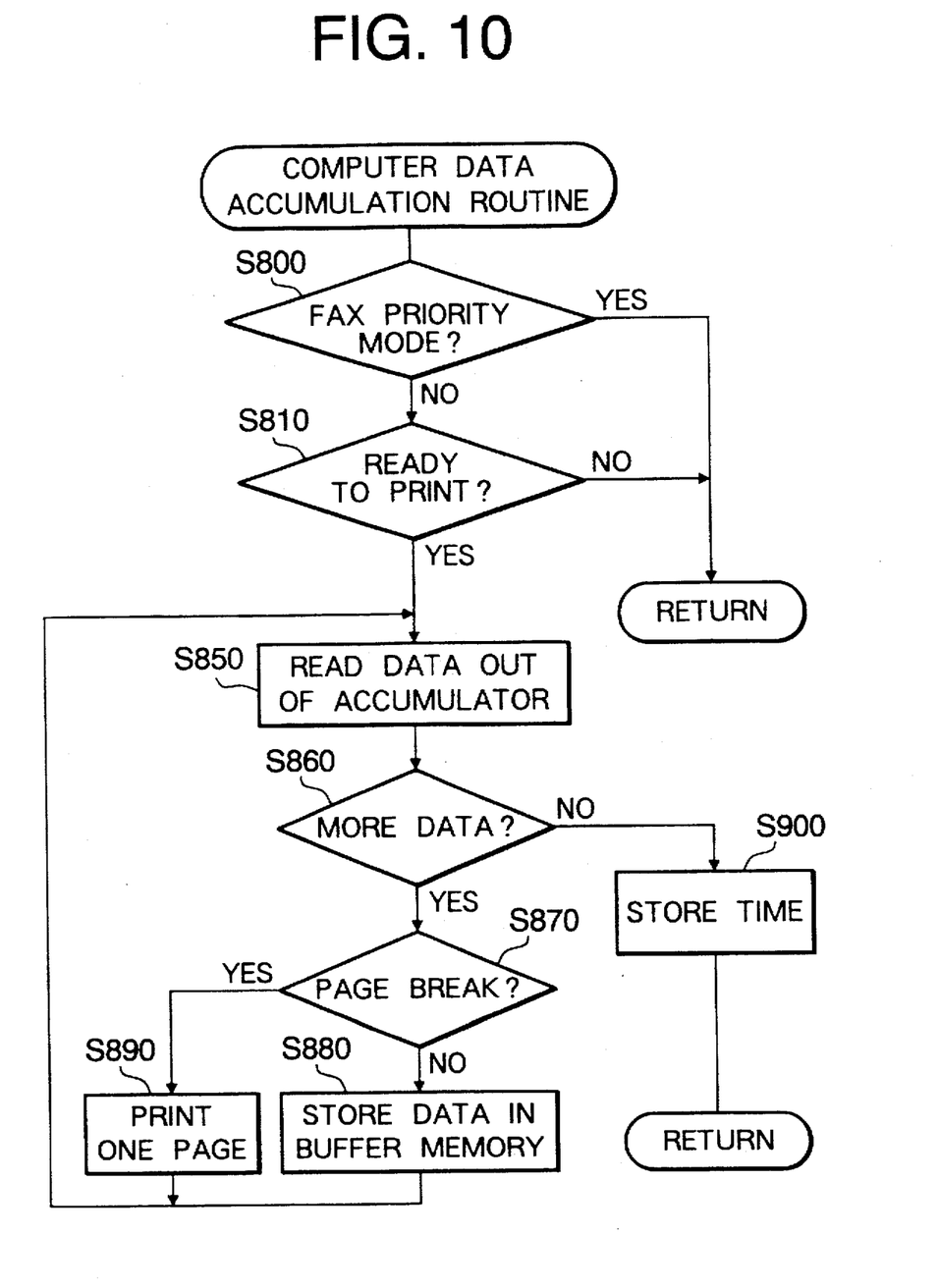
FIG. 10 shows a flowchart of an accumulated data routine of the facsimile device shown in FIG. 1.

FIG. 10 is a flowchart illustrating the accumulated data printing routine.

Initially, step S800 determines whether the current mode is the facsimile priority mode, and step S810 determines whether the image forming unit 26 is ready to print. If the current mode is the facsimile priority mode (S800:YES) or the image forming unit 26 is not ready to print (S810:NO), then the routine is finished.

If the current mode is not the facsimile priority mode (S800:NO) and the image forming unit 26 is ready to print (S810:YES), then the computer data stored in the accumulation accumulator buffer 94a is read out in step S850.

Step S860 determines whether there is more data stored in the accumulator buffer 94a, and step S870 determines whether the received data is a page break command. If there is no more data stored in the accumulator buffer 94a (S860:NO), then the accumulator buffer 94a has become empty and control proceeds to step S900. In step S900, the current time is read from the timer unit, and stored in the print RAM 94. Then the routine ends, and control returns to the main printing routine shown in FIG. 7. The computer data recorded time when the data is stored in the accumulator buffer 94a is dealt with in a similar manner when the data is normally received.

If there is more data stored in the accumulator buffer 94a and the page break command is not received (S870:NO) then the data is stored in the recording buffer 94b in step S880, and the steps S850 through S880 are repeated.

If the data read out of the accumulator buffer 94a is the page break command (S870:YES), then data corresponding to one page has been stored in the recording buffer 94b. Then in step S890 the image forming unit 26 is driven by the print CPU 90 to print the data stored in the recording buffer 94b onto the recording sheet 24.

As described above, according to the facsimile device embodying the invention, when the print priority mode is set, it is released after about five minutes have passed since the mode is set if the print data has not been received. If the print data has been received, the mode is released ten seconds after the print data is recorded.

Therefore, even if the facsimile device is left with the print priority mode being set, the mode is released automatically, and reception of the facsimile data is not prevented.

Further, the time out period when the print data is not received is longer than the case when the print data is being printed. Therefore, a sufficient time is available to the operator to prepare the print job. Thus, the operability of the facsimile device is maintained.

Conversely, when the print data is printed, the print priority mode is released quickly. Therefore, the period during which the facsimile device is prevented from receiving the facsimile data is relatively short. Therefore, the facsimile function of the facsimile device can be used efficiently.

As described above, the facsimile device has a normal mode of operation (i.e., no priority mode is selected), a facsimile priority mode and a print priority mode. Further, as described above, in the present invention, the print priority mode can be set and released automatically. This ensures that the facsimile device is not accidentally left in the print priority mode for a long period of time thereby prohibiting the printing of incoming facsimile data.

Further, the facsimile device according to the present invention may have two modes of operation, for example, one of the normal or facsimile priority mode, and the print priority mode. In this type of facsimile device, the print priority mode can be set and released in a similar manner to that described above. Thus, if the print priority mode is not set, then the normal mode or facsimile priority mode is set. As such, if the print priority mode is released, then the normal or facsimile priority mode is set. This reduces the number of keys required to operate the device, since a single priority mode setting key is sufficient to determine which priority mode is set. Therefore, the overall operation of the facsimile device can be simplified.

A facsimile device that is capable of setting the print priority mode, normal mode, and the facsimile priority mode, can provide similar functions in the facsimile priority mode as are provided in the print priority mode, described above. That is, the facsimile priority mode may be released in accordance with a length of a time period that has elapsed after the facsimile priority mode is set. In this case, the facsimile priority mode may be released when the device is used as a printer, and as such this operation can be performed manually by an operator.

The invention may be modified such that only a single time out period is used. For example, the time out period of five minutes may be employed as both the first and second time out periods. In this case, even if a printing job is finished, the print priority mode is not released immediately. Thus, if a print job is divided into a plurality of print jobs, and each is printed separately, then since the print priority mode is not released until five minutes after each print job is finished, all of the print jobs may be printed without interruption even if there is a request to print the facsimile data.

Alternatively, if the print priority mode is released only after the computer data is printed, then it does not matter how long it takes to prepare the print job before the printing of the data is started. This improves the operability of the facsimile device.

Further, it is possible to release the print priority mode for example, five minutes after the print priority mode is set. In this case, the facsimile device is allowed to operate only a as printer for five minutes, and thereafter, both the printer data and the facsimile data are allowed to be printed.

In the embodiment, the mode setting is done through the operation panel 14. It is also possible to configure the system to accept a command instructing the change of the priority mode, which is transmitted from the computer 98. Further, the first and second time out periods can be changed easily to appropriate values in accordance with the needs of the operator. Alternatively, the time out periods may be changed using the operation panel 14.

In the embodiment, two CPUs are provided for controlling the facsimile unit and the printer unit separately. However, it is possible to provide one CPU which controls both the facsimile unit and the printer unit. This will reduce the number of parts required and lower the cost of manufacturing the facsimile device.

What is claimed is:

1. A facsimile device having a printer function, said facsimile device capable of receiving a facsimile data from another facsimile device and a computer data from a data processing device, said facsimile device comprising:

means for setting a priority operating mode, one of said computer data and said facsimile data being a high priority data and the other of said computer data and said facsimile data being a low priority data in accordance with said priority operating mode;

a buffer;

a means for directing said low priority data to said buffer, said low priority data being stored in said buffer in response to reception thereof when said facsimile device operates in the high priority mode;

means for setting at least one time out period, wherein said facsimile device is released from said priority operating mode after said time out period has elapsed; and means for selecting one of said at least one time out periods in accordance with whether said facsimile device is receiving said high priority data.

2. The facsimile device according to claim 1, wherein when said means for setting said priority operating mode sets said priority operating mode, said means for selecting selects a first time out period when said facsimile device is not receiving said high priority data, and said means for selecting selects a second time out period when said facsimile device is receiving said high priority data, and wherein said first time out period is longer than said second time out period.

3. The facsimile device according to claim 2, wherein said first time out period corresponds to a time duration that starts from a setting of said priority operating mode, and wherein said second time out period corresponds to a time duration that starts after the last received high priority data has been printed.

4. The facsimile device according to claim 1, further comprising:

means for converting said received data into bit map data; and means for forming an image on a recording medium, in accordance with said bit map data.

5. A facsimile device having a printer function, said facsimile device comprising:

means for receiving facsimile data transmitted from another facsimile device;

means for receiving computer data transmitted from an external device;

means for forming an image having a plurality of pixels on a recording medium;

facsimile output control means for converting said facsimile data into facsimile bit map data, said facsimile output control means controlling said image forming means to form an image corresponding to said facsimile bit map data;

printer output control means for converting said computer data into computer bit map data, said printer output control means controlling said image forming means to form an image corresponding to said computer bit map data;

means for setting a priority operating mode, said setting of said priority operating mode determining a priority of printing said facsimile data and said computer data, one of said facsimile data and said computer data being a high priority data and the other of said facsimile data and said computer data being a low priority data in accordance with said priority operating mode:

storing means for storing said low priority data until said priority operating mode is released;

priority mode control means for inhibiting operation of one of said output control means in accordance with said priority operating mode; and time out control means for releasing said priority operating mode if said high priority data has not been received during a predetermined time out period.

6. The facsimile device according to claim 5, wherein said time out control means releases said priority operating mode if said predetermined time out period has elapsed since said priority operating mode was set.

7. The facsimile device according to claim 5, wherein said time out control means releases said priority operating mode if said predetermined time out period has elapsed after said receiving means stops receiving said high priority data.

8. The facsimile device according to claim 5, wherein said time out control means releases said priority operating mode if a first time out period has elapsed since said priority operating mode was set, and wherein said time out control means releases said priority operating mode if a second time out period has elapsed since said data receiving means received said high priority data.

9. The facsimile device according to claim 8, wherein said first time out period is longer than said second time out period.

10. A method for releasing a facsimile device having a printer function, from a priority operating mode, the facsimile device receiving computer data from a data processing device and facsimile data from another facsimile device, the method comprising the steps of:

setting said priority operating mode, one of said computer data and said facsimile data being a high priority data and the other of said computer data and said facsimile data being a low priority data in accordance with said priority operating mode;

storing said low priority data in a buffer in response to reception thereof when the facsimile device operates in the high priority mode;

selecting one of a plurality of time out periods in accordance with whether said facsimile device is receiving said high priority data;

setting a time period selected in the selecting step; and releasing said facsimile device from the priority operating mode after the time out period has elapsed.

11. The method according to claim 10, wherein the selecting step selects a first time out period when the facsimile device is not receiving the high priority data, and the selecting step selects a second time out period when said facsimile device is receiving the high priority data, and wherein the first time out period is longer than the second time out period.

12. The method according to claim 11, wherein the first time out period corresponds to a time duration that starts from a setting of the priority operating mode, and wherein the second time out period corresponds to a time duration that starts from after the last received high priority data is printed.

13. A facsimile device capable of receiving first predetermined data transmitted from a first externally connected device and second predetermined data transmitted from a second externally connected device, said facsimile device being operable at least in a first mode where reception of said first predetermined data is inhibited, and in a second mode where reception of said first predetermined data is allowed, said facsimile device comprising:

means for setting an operation mode of said facsimile device;

means for setting a duration of a time out period in accordance with whether said second predetermined data has already been received while said facsimile device is operating in said second mode; and means for controlling said setting means to shift said operation mode from said second mode to said first mode in response to said facsimile device operating in said second mode and said second predetermined data not being received after said time out period has elapsed.

14. The facsimile device according to claim 13, wherein said first predetermined data is one of facsimile data and computer data, and said second predetermined data is the other of said facsimile data and said computer data.

15. The facsimile device according to claim 13, wherein said first predetermined data is facsimile data and said second predetermined data is computer data.

16. The facsimile device according to claim 13, wherein said means for setting said time out period sets said time out period to a first period in response to said second predetermined data not being received, and sets said time out period to a second period in response to said second predetermined data being received, and wherein said first period is longer than said second period.

17. The facsimile device according to claim 13, wherein when said facsimile device operates in said first mode, reception of said second predetermined data is prohibited.

18. The facsimile device in accordance with claim 4, wherein said priority operating mode is a print priority mode, said computer data being said high priority data and said facsimile data being said low priority data.

19. The facsimile device in accordance with claim 4, wherein said priority operating mode is a facsimile priority mode, said facsimile data being said high priority data and said computer data being said low priority data.

20. The facsimile device in accordance with claim 5, wherein said priority operating mode is a print priority mode, said computer data being said high priority data and said facsimile data being said low priority data.

21. The facsimile device in accordance with claim 5, wherein said priority operating mode is a facsimile priority mode, said facsimile data being said high priority data and said computer data being said low priority data.

22. The method in accordance with claim 10, further comprising the step of, after said priority operating mode is released, directing to a printer any low priority data stored in said buffer.

23. The method in accordance with claim 22, wherein said priority operating mode is a print priority mode, said computer data being said high priority data and said facsimile data being said low priority data.

24. The method in accordance with claim 22, wherein said priority operating mode is a facsimile priority mode, said facsimile data being said high priority data and said computer data being said low priority data.

25. The method according to claim 23, further comprising the steps of:

converting the received computer data into computer bit map data; and forming an image on a recording medium, in accordance with the computer bit map data.

26. The method according to claim 24, further comprising the steps of:

converting the received facsimile data into facsimile bit map data; and forming an image on a recording medium, in accordance with the facsimile bit map data.

* * * * *